Nov. 6, 1923.
I. O. HAINES
SHOCK ABSORBER
Filed Aug. 7, 1922
1,473,343
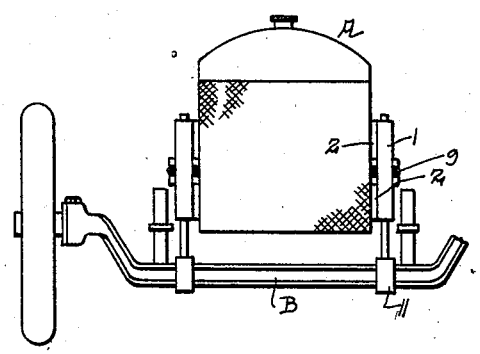
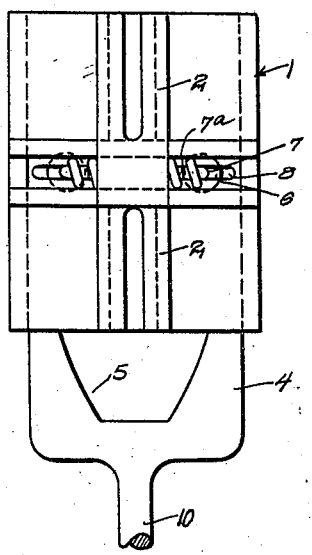
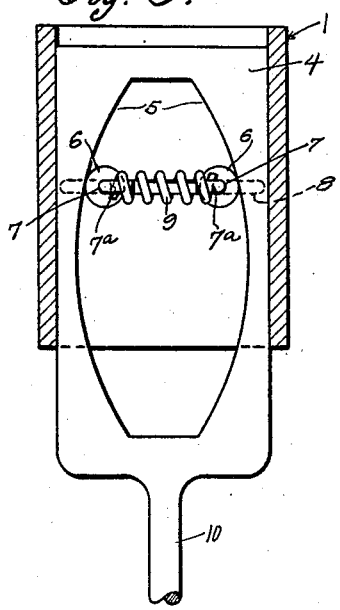
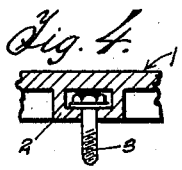
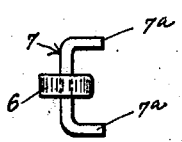
INVENTOR
J. O. Haines
BY Victor J. Evans
ATTORNEY Patented Nov. 6, 1923.

1,473,343

UNITED STATES PATENT OFFICE.

ISAAC O. HAINES, OF PITTSBURGH, PENNSYLVANIA.

SHOCK ABSORBER.

Application filed August 7, 1922. Serial No. 580,190.

*To all whom it may concern:*

Be it known that I, ISAAC O. HAINES, a citizen of the United States, residing at Pittsburgh, in the county of Allegheny and State of Pennsylvania, have invented new and useful Improvements in Shock Absorbers, of which the following is a specification.

This invention relates to shock absorbers, and more particularly to a shock absorber specially adapted for use in connection with automobiles and similar vehicles.

One of the main objects of the invention is to provide a shock absorber of simple construction and operation which may be readily applied to an automobile. A further object is to provide a shock absorber which, when applied, will present a neat appearance and which consists of but few parts and may be readily produced at small cost. Further objects will appear from the detailed description.

In the drawings:—

Figure 1 is a front view of the device as applied;

Figure 2 is a side view of the device;

Figure 3 is a side view of the device the casing being shown in section;

Figure 4 is a fragmentary detail section through one of the attaching brackets;

Figure 5 is a detail of one of the rods.

The device includes a flat casing 1 of rectangular cross-section provided on its inner face with oppositely directed slotted brackets 2 adapted to receive screw bolts 3 by means of which the casing is secured to the body of the automobile A. A block 4 is slidably mounted in this casing for vertical movement and is provided with an opening 5 of truncated elliptical shape extending to within a short distance of the ends of the block. Rollers 6 are positioned within opening 5, these rollers being mounted on rods 7 which extend through transverse slots 8 provided in the inner and outer walls of casing 1. The end portions of rods 7 are bent inwardly at right angles to form studs 7ª which fit into the ends of expansion coil springs 9, these springs acting to force the rods apart so as to hold the rollers 6 pressed against the lateral walls of opening 5. A stem 10 depends from block 4 and is secured at its lower end, by means of a bracket 11, or in any other suitable or preferred manner, to axle B of the automobile.

As the lateral walls of opening 5 converge toward each end of opening 5, and rollers 6 are held pressed against these walls by springs 9, movement of block 4 through the casing in either direction will be resisted by the springs thus providing a shock absorbing device. As will be noted, this device consists of very few parts which may be readily assembled, these parts themselves being of very simple construction, thus providing a shock absorbing device of simple construction and operation which may be readily produced at small cost and can be quickly and easily applied.

What I claim is:—

1. In a device of the character described, a casing, a block slidable through the casing and provided with an opening tapering toward the ends of the block, means for securing the block to the axle of a vehicle, the casing being adapted for securement to the body of the vehicle, and means within the opening of the block and coacting with the walls thereof for resisting movement of said block in either direction through the casing.

2. In a device of the character described, a casing adapted for securement to a vehicle body, a block slidably mounted through the casing, means for securing the block to the axle of the vehicle, the block being provided with an opening tapering toward its ends, members positioned within said opening and held against movement in the direction of movement of the block, and means for forcing said members into contact with the lateral walls of said opening, said means permitting movement of the members toward each other at right angles to the direction of movement of the block during movement of said block.

3. In a device of the character described, a casing, a block slidably mounted in the casing for vertical movement relative thereto, said block being provided with an opening tapering toward the ends of the block, rods extending through said opening and held against movement longitudinally of the block, said rods being movable toward and away from each other transversely of said block, resilient members confined between the rods and acting to force the same apart, members carried by said rods and contacting with the laterial walls of the opening of the block, said casing being adapted for securement to a vehicle body, and means for securing the block to the vehicle axle.

4. In a device of the character described, a casing, a block slidably mounted in the casing for vertical movement and provided with a depending stem, said block being further provided with an opening tapering towards the ends of the block, the casing being provided through its inner and outer walls with transversely extending slots, rods extending through the opening of the block and through said slots, resilient means between the rods for forcing the same apart and members carried by the rods and contacting with the lateral walls of the opening of said block.

5. In a device of the character described, a casing provided through its inner and outer walls with transversely extending slots, a block slidably mounted in the casing for vertical movement and provided with an opening tapering toward the ends of the block, said block being further provided with a depending stem, rods extending through the opening of the block and through said slots, the ends of the rods being bent inwardly substantially at right angles to provide stud elements, expansion coil springs confined between the rods and having their end portions mounted on said stud elements, and rollers mounted on the rods an contacting with the lateral walls of the opening of the block.

6. In a device of the character described, a relatively thin flat casing of rectangular cross-section provided in its inner and outer walls with transversely extending slots, a block slidably mounted in the casing for vertical movement and provided with an opening tapering toward the ends of the block, said block being further provided with a depending stem, rods extending through the opening of the block and through said slots, the ends of the rods being bent inwardly substantially at right angles to provide stud elements, expansion coil springs confined between the rods and having their end portions mounted on said stud elements, and rollers mounted on the rods and contacting with the lateral walls of the opening of the block.

In testimony whereof I affix my signature.

ISAAC O. HAINES.